(12) United States Patent
Yoshitake et al.

(10) Patent No.: US 7,625,986 B2
(45) Date of Patent: Dec. 1, 2009

(54) ADDITIONAL-CURABLE ORGANOPOLYSILOXANE RESIN COMPOSITION AND AN OPTICAL MATERIAL

(75) Inventors: Makoto Yoshitake, Funabashi (JP); Koji Nakanishi, Chiba (JP); Hisataka Nakashima, Chiba (JP); Hideki Kobayashi, Ichihara (JP); Masashi Murakami, Hiroshima (JP); Kasumi Takeuchi, Ichihara (JP)

(73) Assignees: Dow Corning Corporation, Midland, MI (US); Dow Corning Toray Company, Ltd., Tokyo (JP)

( * ) Notice: Subject to any disclaimer, the term of this patent is extended or adjusted under 35 U.S.C. 154(b) by 442 days.

(21) Appl. No.: 10/581,422

(22) PCT Filed: Nov. 29, 2004

(86) PCT No.: PCT/JP2004/018093

§ 371 (c)(1),
(2), (4) Date: Mar. 21, 2007

(87) PCT Pub. No.: WO2005/054371

PCT Pub. Date: Jun. 16, 2005

(65) Prior Publication Data

US 2008/0033120 A1    Feb. 7, 2008

(30) Foreign Application Priority Data

Dec. 2, 2003  (JP)  ............ 2003-402810

(51) Int. Cl.
*C08G 77/12* (2006.01)
(52) U.S. Cl. ............ 525/478; 528/31; 528/32; 528/43
(58) Field of Classification Search ........... 525/478; 528/31, 33, 34, 38, 15; 524/477, 478, 479, 524/588
See application file for complete search history.

(56) References Cited

U.S. PATENT DOCUMENTS

| | | | |
|---|---|---|---|
| 3,732,330 A | 5/1973 | Mink et al. | |
| 3,944,519 A | 3/1976 | Mink et al. | |
| 3,948,848 A | 4/1976 | Mink | |
| 4,198,131 A * | 4/1980 | Birdsall et al. | ......... 351/160 R |
| 4,234,713 A | 11/1980 | LeGrow | |
| 6,313,190 B1 | 11/2001 | Bublewitz et al. | |
| 6,815,520 B2 | 11/2004 | Yoneda et al. | |
| 2001/0039323 A1 | 11/2001 | Achenbach et al. | |
| 2002/0161140 A1 | 10/2002 | Yoneda et al. | |

FOREIGN PATENT DOCUMENTS

| | | |
|---|---|---|
| GB | 2022115 | 12/1979 |
| JP | 51107350 | 9/1976 |
| JP | 52018755 | 2/1977 |
| JP | 54159459 | 12/1979 |
| JP | 2002265787 | 9/2002 |

OTHER PUBLICATIONS

English language abstract for JP51107350 extracted from espacenet.com database Mar. 20, 2007.
English language abstract for JP54159459 extracted from espacenet.com database Dec. 28, 2006.
English language abstract for JP2002265787 extracted from epsacenet.com database Dec. 28, 2006.

* cited by examiner

*Primary Examiner*—Kuo-Liang Peng
*Assistant Examiner*—Alvin C Collins, III
(74) *Attorney, Agent, or Firm*—Howard & Howard Attorneys PLLC

(57) ABSTRACT

An addition-curable organopolysiloxane resin composition having, in a state of cued body, a hardness of 60 to 100 at 25 degree C. and 40 to 100 at 150 degree C. as measured in accordance with the provisions of ASTM D2240-86, said composition comprising: (A) 100 parts by weight of an organopolysiloxane resin comprised of at least alkenyl groups and phenyl groups; (B) 10 to 50 parts by weight of an organooligosiloxane comprised of at least alkyl groups and phenyl groups; (C) 20 to 100 parts by weight of an organohydrogenoligosiloxane of organohydrogenpolysiloxane; and (D) an addition-reaction catalyst in a catalytic quantity; an optical material that is comprised of a cured body produced from aforementioned components (A), (B), and (C) and possesses the aforementioned characteristics.

8 Claims, No Drawings

ADDITIONAL-CURABLE ORGANOPOLYSILOXANE RESIN COMPOSITION AND AN OPTICAL MATERIAL

RELATED APPLICATIONS

This application claims priority to and all the advantages of International Patent Application number PCT/JP2004/018093, filed on Nov. 29, 2004, which claims priority to Japanese Patent Application JP 2003-402810, filed on Dec. 2, 2003.

TECHNICAL FIELD

The invention relates to an addition-curable organopolysiloxane resin composition and to an optical material comprised of a cured body of the aforementioned composition.

BACKGROUND ART

Nowadays, optical parts, such as lenses made from inorganic glass, are frequently replaced by organic resins in view of good workability, light weight, low cost, high resistance to impacts, and other useful properties inherent in the aforementioned organic materials. In response to recent miniaturization of optical elements, intensification of light sources along with increase in working temperatures and light intensities, a demand occurred for development of new organic resin materials that would possess high resistance to heat and light. On the other hand, it is well known that silicone resins are characterized by excellent resistance to heat, excellent resistance to low temperatures and such properties as excellent electrical insulating characteristics, water repellency, transparency, etc. Therefore, curable silicone resin compositions find application in various fields of industry. Moreover, it is expected that, due to color stability and the ability of maintaining better physical properties than other organic resin materials, silicone resin compositions will find wider use as a material for manufacturing optical elements.

Curable silicone resin compositions, and among them, in particular, curable organopolysiloxane resin compositions such as addition-curable organopolysiloxane resin compositions, are characterized by good curability, rapid curing, and absence of by-products.

For example, Japanese Patent Publication (Kokoku) No. S52-44900 (that corresponds to U.S. Pat. No. 3,732,330) discloses an addition-curable silicone resin composition that is comprised of a methylphenylvinylpolysiloxane resin composed of $C_6H_5SiO_{3/2}$ units and $CH_2=CH(CH_3)_2SiO_{1/2}$ units, di(dimethylhydrogensiloxy)diphenylsilane represented by the following formula: $[H(CH_3)_2SiO]_2Si(C_6H_5)_2$, and a platinum catalyst.

Japanese Unexamined Patent Application Publication (hereinafter referred to as Kokai) No. S53-20545 discloses a curable organopolysiloxane resin composition that is comprised of a methylphenylvinylsiloxane resin composed of monophenylsiloxane units, diphenylsiloxane units, dimethylsiloxane units, and vinylmethylsiloxane units, a linear-chain methylphenylhydrogenpolysiloxane composed of diphenylsiloxane units, methylhydrogensiloxane units, dimethylsiloxane units, and trimethylsiloxane units, and a platinum catalyst. The above materials are used as coating agents, moldable resins, and encapsulators for electronic parts. Furthermore, Kokai 2002-265787 describes an addition-curable silicone resin composition that consists of an organopolysiloxane resin that contains phenyl and alkenyl groups, a phenyl containing organohydrogenpolysiloxane, and a hydrosilation-curing catalyst. Cured bodies produced from the last-mentioned composition possess high transparency, strength, and hardness, and therefore find application for manufacturing parts of electronic and electrical devices, office-automation machines, and precision instruments.

However, a methylphenylpolysiloxane resin is normally in a solid or in a highly viscous liquid state and, therefore, it does not possess satisfactory moldability and flowability. Thus, Kokai S54-159459 (that corresponds to U.S. Pat. No. 4,234,713) describes an addition-curable organopolysiloxane resin composition which is comprised of a methylphenylvinylpolysiloxane resin composed of $C_6H_5SiO_{3/2}$ units and $CH_2=CH(CH_3)_2SiO_{1/2}$ units, a dimethylhydrogensiloxyphenylsilane composed of units expressed by formulae $[H(CH_3)_2SiO]_2Si(C_6H_5)_2$ or $[H(CH_3)_2SiO]_3Si(C_6H_5)$, and a platinum catalyst with an addition of a diluent in the form of a diphenylbis(dimethylvinylsiloxy)silane. Practical Example No. 1 of Kokai H11-1619 discloses an addition-curable organopolysiloxane resin composition, which is comprised of a methylphenylvinylpolysiloxane resin, methylphenylhydrogenoligosiloxane, and a platinum catalyst with an addition of a disiloxane of the following formula: $[CH_2=CH(CH_3)_2Si]_2O$.

However, the aforementioned patent references do not show curable organopolysiloxane compositions or addition-curable silicone resin compositions capable of preserving their hardness at high temperatures. If a cured body looses its hardness at high temperatures, it becomes unsuitable for use as an optical material. For example, when an optical lens is located in a vicinity of a light-emitting element, or when the resin is used as a sealant, coating agent, or an adhesive substance and operates near a highly intensive light source, such optical elements and agents may be subject to thermal deformations.

SUMMARY OF THE INVENTION

As a result of studies aimed at the solution of the prior-art problems the inventors of the present patent application arrived at the present invention and developed an addition-curable organopolysiloxane resin composition of the invention by testing the following items: contents of phenyl and alkenyl groups in an organopolysiloxane resin that is comprised of at least alkenyl groups; the weight-average molecular weight of the aforementioned resin; the amount of phenyl groups and silicon-bonded hydrogen atoms in a phenyl-containing organohydrogenpolysiloxane; contents of phenyl and alkenyl groups in an organooligosiloxane that contains at least alkenyl and phenyl groups and that constitutes a reactive diluent; and various specific proportions of the aforementioned components.

It is an object of the present invention to provide an addition-curable organopolysiloxane resin composition that would possess excellent flowability, moldability in combination with transparency, high hardness and strength in a cured state, and the ability to preserve its hardness at high temperatures. It is another object to provide an optical material comprised of a solid body that is obtained by curing an organopolysiloxane in an addition reaction and that is characterized by high transparency, hardness, and strength in combination with an ability to maintain its hardness at high temperatures.

The present invention provides the following.

[1] An addition-curable organopolysiloxane resin composition having, in a state of a cured body, a hardness of 60 to 100 at 25° C. and 40 to 100 at 150° C. as measured in accordance with the provisions of ASTM D2240-86, said composition comprising;

(A) 100 parts by weight of an organopolysiloxane resin represented by the following average compositional formula:

  (1)

(where $R^1$ designates alkenyl groups with 2 to 10 carbon atoms, $R^2$ designates substituted or non-substituted univalent hydrocarbon groups (except for alkenyl groups), at least 50 mole % of $R^2$ being comprised of phenyl groups; "a" is within the range of 0.09 to 0.16, and "b" is within the range of 1.00 to 1.20), said organopolysiloxane resin being comprised of at least alkenyl groups and phenyl groups and having a weight-average molecular weight, with polystyrene as reference and determined by gel chromatography, equal to or exceeding 3000;

(B) 10 to 50 parts by weight of an organooligosiloxane represented by the following average compositional formula:

  (2)

(where $R^3$ designates alkenyl groups with 2 to 10 carbon atoms, $R^4$ designates substituted or non-substituted univalent hydrocarbon groups (except for alkenyl groups), at least 10 mole % of $R^4$ being comprised of phenyl groups; "c" is within the range of 0.60 to 0.80, and "d" is within the range of 1.50 to 2.10), said organooligosiloxane being comprised of at least alkenyl groups and phenyl groups;

(C) 20 to 100 parts by weight of an organohydrogenoligosiloxane or organohydrogenpolysiloxane represented by the following average compositional formula:

  (3)

(where $R^5$ designates substituted or non-substituted univalent hydrocarbon groups (except for alkenyl groups), at least 20 mole % of $R^5$ being comprised of phenyl groups; "e" is within the range of 0.35 to 0.65, and "f" is within the range of 0.90 to 1.70); and (D) an addition-reaction catalyst in a catalytic quantity.

[2] The addition-curable organopolysiloxane resin composition of Item [1], wherein: in said average compositional formula (1), "a" is within the range of 0.10 to 0.15, and "b" is within the range of 1.00 to 1.15; in said average compositional formula (2), "c" is within the range of 0.60 to 0.80, and "d" is within the range of 1.50 to 2.00; and in said average-compositional formula (3), "e" is within the range of 0.35 to 0.65, and "f" is within the range of 1.30 to 1.70.

[3] The addition-curable organopolysiloxane resin composition according to Item [1] or Item [2], wherein component (B) is an organooligosiloxane expressed by the following formula:

  (4)

(where $R^7$ designates alkenyl groups with 2 to 10 carbon atoms, $R^8$, each independently, may designate substituted or non-substituted univalent hydrocarbon groups (except for alkenyl groups), at least 10 mole % of $R^8$ being comprised of phenyl groups; and "g" is 2 or 3), said organooligosiloxane being comprised of at least alkenyl groups and phenyl groups.

[4] An optical material that comprises a cured body obtained by curing the following components via an addition reaction:

(A) 100 parts by weight of an organopolysiloxane resin represented by the following average compositional formula:

  (1)

(where $R^1$ designates alkenyl groups with 2 to 10 carbon atoms, $R^2$ designates substituted or non-substituted univalent hydrocarbon groups (except for alkenyl groups), at least 50 mole % of $R^2$ being comprised of phenyl groups; "a" is within the range of 0.09 to 0.16, and "b" is within the range of 1.00 to 1.20), said organopolysiloxane resin being comprised of at least alkenyl groups and phenyl groups and having a weight-average molecular weight, with polystyrene as reference and determined by gel chromatography, equal to or exceeding 3000;

(B) 10 to 50 parts by weight of an organooligosiloxane represented by the following average compositional formula:

  (2)

(where $R^3$ designates alkenyl groups with 2 to 10 carbon atoms, $R^4$ designates substituted or non-substituted univalent hydrocarbon groups (except for alkenyl groups), at least 10 mole % of $R^4$ being comprised of phenyl groups; "c" is within the range of 0.60 to 0.80, and "d" is within the range of 1.50 to 2.10), said organooligosiloxane being comprised of at least alkenyl groups and phenyl groups;

(C) 20 to 100 parts by weight of an organohydrogenoligosiloxane or organohydrogenpolysiloxane represented by the following average compositional formula:

  (3)

(where $R^5$ designates substituted or non-substituted univalent hydrocarbon groups (except for alkenyl groups), at least 20 mole % of $R^5$ being comprised of phenyl groups; "e" is within the range of 0.35 to 0.65, and "f" is within the range of 0.90 to 1.70); said cured body having a hardness of 60 to 100 at 25° C. and 40 to 100 at 150° C. as measured in accordance with the provisions of ASTM D2240-86.

[5] The optical material according to Item [4], wherein "a" in said average compositional formula (1) is within the range of 0.10 to 0.15, "b" is within the range of 1.00 to 1.15, wherein "c" in said average compositional formula (2) is within the range of 0.60 to 0.80, "d" is within the range of 1.50 to 2.00, and wherein "e" in said average compositional formula (3) is within the range of 0.35 and 0.65, and "f" is within the range of 1.30 to 1.70.

[6] The optical material according to Item [4] or Item [5], wherein component (B) is an organooligosiloxane expressed by the following formula:

  (4)

(where $R^7$ designates alkenyl groups with 2 to 10 carbon atoms, $R^8$, each independently, may designate substituted or non-substituted univalent hydrocarbon groups (except for alkenyl groups), at least 10 mole % of $R^8$ being comprised of phenyl groups; and "g" is 2 or 3), said organooligosiloxane being comprised of at least alkenyl groups and phenyl groups.

As it has been mentioned above, the addition-curable organopolysiloxane resin composition of the present invention possesses excellent flowability, moldability in combination with transparency, high hardness and strength in a cured state, and the ability to preserve its hardness at high temperatures. In other words, at high temperatures a cured body obtained from the composition of the present invention will have almost the same hardness as at room temperature. Furthermore, an optical material comprised of a solid body obtained by curing an organopolysiloxane in an addition reaction will have high transparency, hardness, and strength in combination with the ability to maintain its hardness at high temperatures.

BEST MODE FOR CARRYING OUT THE INVENTION

Component (A) that is an organopolysiloxane resin represented by aforementioned average compositional formula (1) $R^1_a R^2_b SiO_{(4-a-b)/2}$ and that contains at least alkenyl groups and phenyl groups is one of the main components of the addition-curable organopolysiloxane resin composition of the present invention. Under the catalytic action of component (D), the aforementioned alkenyl groups participate in an addition reaction and are crosslinked with silicon-bonded hydrogen atoms of component (C) to form a cured body.

In aforementioned formula (1), $R^1$ designates alkenyl groups with 2 to 10 carbon atoms and may be represented by vinyl groups, allyl groups, butenyl groups, hexenyl groups, and decenyl groups, of which vinyl groups are preferable as they have better addition reactivity and easier formation of the aforementioned organopolysiloxane. $R^2$ designates substituted or non-substituted univalent hydrocarbon groups (except for alkenyl groups) and may be represented by methyl groups, ethyl groups, propyl groups, cyclohexyl groups or similar alkyl groups; tolyl groups, naphthyl groups, or similar aryl groups; 3-chloropropyl groups, 3,3,3-trifluoropropyl groups, 2-(nonafluoropropyl) ethyl groups, or similar haloalkyl groups; ethylbenzyl groups, 1-phenethyl groups, or similar aralkyl groups. Of these, most preferable are phenyl groups alone or in combinations with methyl groups. For providing the cured body with high transparency, strength, and hardness, in one molecule at least 50 mole % of all $R^2$ should be comprised of phenyl groups, while the remaining may be alkyl groups.

In the above formula, "a" that shows an average number of alkenyl groups per 1 silicon atom of component (A) should be within the range of 0.09 to 0.16, preferably 0.10 to 0.15; "b" shows an average number of substituted and non-substituted hydrocarbon groups (other than alkenyl groups) per 1 silicon atom of component (A) and should be within the range of 1.00 to 1.20. With "a" and "b" beyond the above limits, it would be difficult to provide the cured body of the invention with desired characteristics.

In order to provide the cured body of high hardness, it should have a weight-average molecular weight (using standard polystyrene as a reference) equal to or greater than 3,000, as measured by gel permeation chromatography. At a temperature of 25° C., the present component is in a solid or a viscous-liquid state. When it is liquid, its viscosity normally exceeds 10 Pa·s. This component normally has a branched, net-like, or a three-dimensional structure.

Siloxane units that form aforementioned component (A) can be exemplified by $ViMe_2SiO_{1/2}$ units, $ViMePhSiO_{1/2}$ units, $Me_3SiO$ units, $Me_2SiO_{2/2}$ units, $ViMeSiO_{2/2}$ units, $PhSiO_{3/2}$ units, $MeSiO_{3/2}$ units, and $ViSiO_{3/2}$ units, where, here and hereinafter, Me designates methyl group, Vi designates vinyl group, and Ph designates phenyl group.

Specific examples of component (A) are organopolysiloxane resins that are shown by the siloxane unit formulae and average compositional formulae given below and that contain at least alkenyl and phenyl groups; the siloxane unit formulae indicate mole numbers of various siloxane units for the case when all siloxane units of a molecule constitute 1 mole:

$(ViMe_2SiO_{1/2})_{0.10}(PhSiO_{3/2})_{0.90}$,
  $Vi_{0.10}Me_{0.20}Ph_{0.90}SiO_{1.4}$ a=0.10, b=1.10, Ph/$R^2$(mole %)=74, $M_w$=4300;

$(ViMe_2SiO_{1/2})_{0.14}(PhSiO_{3/2})_{0.86}$,
  $Vi_{0.14}Me_{0.28}Ph_{0.86}SiO_{1.34}$ a=0.14, b=1.14, Ph/$R^2$(mole %)=67, $M_w$=3200;

$(ViMeSiO_{2/2})_{0.10}(PhSiO_{3/2})_{0.90}$,
  $Vi_{0.10}Me_{0.10}Ph_{0.90}SiO_{1.45}$ a=0.10, b=1.00, Ph/$R^2$(mole %)=82, $M_w$=8700;

$(ViMeSiO_{2/2})_{0.10}(Me_2SiO_{2/2})_{0.15}(PhSiO_{3/2})_{0.75}$,
  $Vi_{0.10}Me_{0.40}Ph_{0.75}SiO_{1.375}$ a=0.10, b=1.15, Pb/$R^2$(mole %)=60, $M_w$=7200;

where $R^2$ is a total mole quantity of Me and Ph, and $M_W$ is a weight-average molecular weight (using standard polystyrene as a reference) determined by gel permeation chromatography.

Component (B) represented by aforementioned average compositional formula (2) $R^3_c R^4_d SiO_{(4-c-d)/2}$ is an organooligosiloxane that is an indispensable component required for obtaining desired characteristics in a cured body of the present invention. It is comprised of at least alkenyl groups and phenyl groups. In the addition-curable organopolysiloxane resin composition of the present invention, this component is used for reducing viscosity of the composition and for improving moldability and flowability.

In average compositional formula (2), $R^3$ designates alkenyl groups with 2 to 10 carbon atoms that can be the same as the aforementioned groups listed for $R^1$; and $R^4$ designates substituted or non-substituted univalent hydrocarbon groups (except for alkenyl groups) that can be the same as the aforementioned groups listed for $R^2$. At least 10 mole % of $R^4$ should be comprised of phenyl groups, while the remaining groups may be alkyl groups. It is preferable to have $R^4$ consisting of phenyl groups alone, or of phenyl groups in combination with methyl groups. This is required for improving affinity between components (A) and (C) in the composition, as well as for improving resistance to heat and transparency in a cured body.

In formula (2), "c" that designates an average number of alkenyl groups per 1 silicon atom in component (B) should be within the range of 0.60 to 0.80, and "d" that designates an average number of substituted or non-substituted univalent hydrocarbon groups (except for alkenyl groups) per 1 silicon atom in component (B) should be within the range of 1.50 to 2.10, preferably, 1.50 to 2.00.

Component (B) may also be comprised of an alkenyl-functional organooligosiloxane of the following formula: $(R^7R^8_2SiO)_g SiR^8_{(4-g)}$, where $R^7$ designates alkenyl groups with 2 to 10 carbon atoms. These groups may be the same as those listed above for $R^3$. The use of vinyl groups is preferable. In the above formula, $R^8$, each independently, may designate substituted or non-substituted univalent hydrocarbon groups (except for alkenyl groups). These groups may be the same as those listed above for $R^4$. In this connection, the use of phenyl groups alone or in combination with methyl groups is preferable; "g" is 2 or 3. In order to be able to dissolve solid component (A) or to reduce viscosity of a highly viscous liquid component (A) at room temperature, component (B) itself should be liquid at room temperature and have viscosity at 25° C. below 10 Pa·s, preferably within the range of 1 mPa·s to 100 mPa·s.

Specific examples of component (B) are methylphenylvinyloligosiloxanes shown by the following siloxane unit formulae and average compositional formulae:

$(ViMe_2SiO)_3SiPh$, $Vi_{0.75}Me_{1.50}Ph_{0.25}SiO_{0.75}$, c=0.75,
  d=1.75, Ph/$R^4$(mole %)=14

$(ViMe_2SiO)_2SiPh_2$, $Vi_{0.67}Me_{1.33}Ph_{0.67}SiO_{0.67}$,
  c=0.67, d=2.00, Ph/$R^4$(mole %)=33

$(ViMePhSiO)_3SiPh$, $Vi_{0.75}Me_{0.75}Ph_{1.00}SiO_{0.75}$,
c=0.75, d=1.75, Ph/$R^4$(mole %)=57

$(ViMePhSiO)_2SiPh_2$, $Vi_{0.67}Me_{0.67}Ph_{1.33}SiO_{0.67}$,
c=0.67, d=2.00, Ph/$R^4$(mole %)=67

$(ViMe_2SiO)_2SiMePh$, $Vi_{0.67}Me_{1.67}Ph_{0.33}SiO_{0.67}$,
c=0.67, d=2.00, Ph/$R^4$(mole %)=17 where $R^4$ is a total mole quantity of Me and Ph. Two or more different components (B) can be used in a combination.

Component (C) represented by average compositional formula (3) $H_eR^5_fSiO_{(4-e-f)/2}$ is comprised of an organohydrogenoligosiloxane or organohydrogenpolysiloxane. Silicon-bonded hydrogen atoms of this component participate in an addition reaction with silicon-bonded alkenyl groups of component (A). More specifically, component (C) promotes a hydrosilation reaction and cross-linking of component (A). Furthermore, its silicon-bonded hydrogen atoms also participate in an addition reaction with the silicon-bonded alkenyl groups of component (B).

In average compositional formula (3), H designates a hydrogen atom, $R^5$ designates substituted or non-substituted univalent hydrocarbon groups (except for alkenyl groups), and at least 20 mole % of $R^5$ are comprised of phenyl groups. Groups R may be the same as those listed above for $R^2$ and preferably should be phenyl groups alone or in combination with methyl groups. In formula (3), "e" indicates a number of silicon-bonded hydrogen atoms per one silicon atom of component (C) and should be within the range of 0.35 to 0.65; "f" indicates an average number of substituted or non-substituted univalent hydrocarbon groups (except for alkenyl groups) per one silicon atom of component (C) and should be within the range of 0.90 to 1.70, preferably 1.30 to 1.70. At 25° C., component (C) may be solid or liquid, but the liquid form is preferable as it facilitates preparation of the composition. Viscosity of this component should not exceed 100 Pa·s and preferably should be within the range of 1 to 1,000 mPa·s.

Specific examples of component (C) are methylphenylhydrogenoligosiloxanes or methylphenylhydrogenpolysiloxanes shown by the following siloxane unit formulae and average compositional formulae:

$(HMe_2SiO_{1/2})_{0.65}(PhSiO_{3/2})_{0.35}$,
$H_{0.65}Me_{1.30}Ph_{0.35}SiO_{0.85}$, e=0.65, f=1.65, Ph/$R^5$(mole %)=21

$(HMe_2SiO_{1/2})_{0.60}(PhSiO_{3/2})_{0.40}$,
$H_{0.60}Me_{1.2}Ph_{0.40}SiO_{0.90}$, e=0.60, f=1.60, Ph/$R^5$(mole %)=25

$(HMe_2SiO_{1/2})_{0.40}(PhSiO_{3/2})_{0.60}$,
$H_{0.40}Me_{0.80}Ph_{0.60}SiO_{1.10}$, e=0.40, f=1.40, Ph/$R^5$(mole %)=43

$(HMe_2SiO_{1/2})_{0.35}(PhSiO_{3/2})_{0.65}$,
$H_{0.35}Me_{0.70}Ph_{0.65}SiO_{1.15}$, e=0.35, f=1.05, Ph/$R^5$(mole %)=48

$(HMeSiO_{2/2})_{0.65}(PhSiO_{3/2})_{0.35}$,
$H_{0.65}Me_{0.65}Ph_{0.35}SiO_{1.175}$, e=0.65, f=1.00, Ph/$R^5$(mole %)=35

$(HMe_2SiO_{2/2})_{0.50}(PhSiO_{3/2})_{0.50}$,
$H_{0.5}Me_{0.50}Ph_{0.50}SiO_{1.25}$, e=0.50, f=1.00, Ph/$R^5$(mole %)=50

$(HMeSiO_{2/2})_{0.35}(PhSiO_{3/2})_{0.65}$,
$H_{0.35}Me_{0.35}Ph_{0.65}SiO_{1.325}$, e=0.35, f=1.00, Ph/$R^5$(mole %)=65

$(HMePhSiO_{1/2})_{0.60}(PhSiO_{3/2})_{0.40}$, $H_{0.60}Me_{0.60}Ph_{1.00}SiO_{0.90}$, e=0.60, f=1.60, Ph/$R^5$(mole %)=63

$(HMePhSiO_{1/2})_{0.40}(PhSiO_{3/2})_{0.60}$,
$H_{0.4}Me_{0.40}Ph_{1.00}SiO_{1.10}$, e=0.40, f=1.40, Ph/$R^5$(mole %)=71

In these formulae, $R^5$ is a total quantity of Me and Ph. Two or more components (C) of different types may be used in a combination.

It is recommended that the components (B) and (C) be used in an amount of 10 to 50 parts by weight, preferably 20 to 100 parts by weight per 100 parts by weight of component (A). In order to provide high hardness and physical properties in a cured body, silicon-bonded hydrogen atoms of component (C) per one mole of alkenyl groups in components (A) and (B) should be contained in an amount of 0.5 to 3 moles, preferably 0.7 to 2.0 moles.

An addition-reaction catalyst that is component (D) is a catalyst that promotes an addition reaction, i.e., a hydrosilation reaction, between alkenyl groups of components (A) and (B) and silicon-bonded hydrogen atoms of component (C). Component (D) may be represented by a platinum black, platinum dichloride, chloroplatinic acid, a product of a reaction between a chloroplatinic acid and a monohydric alcohol, a complex of a chloroplatinic acid and diolefin, platinumbis (ethylacetoacetate), platinumbis-(acetylacetonate), a complex of a chloroplatinic acid and 1,3-divinyltetramethyldisiloxane, or similar platinum-type catalysts; rhodium-type catalysts, or other platinum metal group type catalyst. Of these, most preferable are platinum type catalysts. The aforementioned addition-reaction catalysts should be used in so-called catalytic quantities. In terms of metallic platinum, the total amount of such catalysts should be within the range of 1 to 500 ppm, preferably 2 to 100 ppm per total weight of components (A) to (C).

In order to extend the pot life of the addition-curable organopolysiloxane resin composition of the present invention, the composition can be combined with a hydrosilation-reaction retarder that will inhibit curing at room temperature. If necessary, within the limits not detrimental to the effects of the present invention, the composition may also be combined with a fumed silica, quartz powder, or a similar fine-powdered silica, titanium oxide, zinc oxide or a similar inorganic filler, a pigment, flame retarder, heat-resistant agent, oxidation inhibitor, etc.

The addition-curable organopolysiloxane resin composition of the invention can be easily prepared by mixing aforementioned indispensable components (A) to (D), if necessary, with the addition of the aforementioned arbitrary components. Since after mixing components (A) to (D) curing may start even at room temperature, the pot life of the composition may be extended by adding a hydrosilation-reaction retarder. If necessary, components (A), (B), and (D) or components (A), (B) and (C) can be stored in a premixed state and uniformly stirred directly prior to use.

The addition-curable organopolysiloxane resin composition of the present invention prepared by the above method can be easily cured to form a cured body that has hardness of 60 to 100 at 25° C. and hardness of 40 to 100 at 150° C., as measured by Type D durometer in accordance with ASTM D2240-86. For comparison, conventional addition-curable organopolysiloxane resin compositions can not easily form a cured body with hardness exceeding 60 on the scale of Type D durometer, and increase in temperature causes decrease of hardness. Thus, with conventional compositions, hardness dropped significantly at 150° C. and became less than 40 when measured in accordance with ASTM D2240-86 by the type D durometer, or a cured body was deteriorated during hardness measurement, so that it was practically impossible to obtain measurement results. In contrast to this, a cured body obtained from the addition-curable organopolysiloxane resin composition of the present invention has hardness within the range of 40 to 100, normally between 40 and 60, as measured in accordance with ASTM D2240-86 by the type D durometer. ASTM D2240-86 corresponds to JIS K 7215-1986 that specifies testing methods for durometer hardness of plastics.

There are no special restrictions with regard to viscosity of the addition-curable organopolysiloxane resin composition of the present invention, if this composition is liquid at room temperature. However, in order to provide moldability and flowability suitable for curing, it is recommended to have viscosity at 25° C. below 5,000 Pa·s, preferably between 10 and 1000 Pa·s. The addition-curable organopolysiloxane resin composition of the present invention can be gradually cured by retaining it at room temperature or can be rapidly cured by heating. A cured body can be obtained in a desired form by extrusion, compression, casting, application of coatings, etc. The composition may be cured alone or in contact with another material, in order to form an integrated body with the aforementioned another material.

Curing time and temperature may vary. Normally, at temperature of 100° C. to 200° C. curing may have a duration from 1 sec. to 30 min. Directly after curing, the cured body may be subjected to secondary curing (post-curing) for 10 min. to 2 hours at 150 to 200° C. that may be required for the removal of volatile components that may be contained in a cured body in quantities from small to microscopic.

An optical material of the present invention comprises a cured body obtained by curing 100 parts by weight of component (A), 10 to 50 parts by weight of component (B), and 20 to 100 parts by weight of component (C) via an addition reaction; said cured body having a hardness of 60 to 100 at 25° C. and 40 to 100 at 150° C. as measured in accordance with the provisions of ASTM D2240-86.

An optical material of the present invention is a material permeable to visible light, infrared rays, ultraviolet rays, near-ultraviolet rays, X-rays, laser rays, etc. These optical materials can be optical lenses, prisms, light-guiding plates, polarization plates, light guides, sheets, films, or similar objects of a predetermined shape; molding agents, sealants, coating agents, adhesive, or other products of undefined shape. These materials are especially advantageous for optical parts and elements operating at temperatures higher than room temperature, e.g., at 50 to 200° C., as well as for optical parts operating in direct contact or in vicinity of light sources of high light intensity.

EXAMPLES

The present invention will be further described more specifically with reference to synthesis, practical, and comparative examples. It should be understood, however, that these examples do not limit the scope of practical application of the invention. All viscosities mentioned in the examples were measured by a Type E rotary viscometer at 25° C. Cured body specimens were produced by pouring the prepared composition into a 100 mm long, 10 mm wide, and 4 mm deep mold, curing the composition for 15 min by heating at 170° C., and post-curing twice for 30 min. at 200° C. after removal from the mold. Hardness was measured in air at 25° C. by means of a Type D durometer in accordance with ASTM D2240-86. Hardness at 150° C. was measured on a 150° C. hot plate, also with the use of a Type D durometer and in accordance with ASTM D2240-86. In subsequent Practical and Comparative Examples the "Type D durometer hardness in accordance with ASTM D2240-86" will be referred to merely as "durometer hardness". Light transmittance at 400 nm and 600 nm was measured by inserting the aforementioned cured body samples into a quartz cell, filling the spaces with toluene, and measuring transmittance spectra with the use of an automatic spectrophotometer. Contents of metallic platinum is indicated in wt. %.

Synthesis Example 1

A four-neck flask equipped with a stirrer, reflux condenser, loading port, and thermometer was filled with 42.8 g of 1,3-divinyl-1,1,3,3-tetramethyldisolxane, 150 g of water, 0.41 g of trifluoromethanesulfonic acid, and 500 g of toluene. The components were mixed, and then 560 g of a phenyltrimethoxysilane were added dropwise during 1 hour under stirring conditions of the mixture. When the addition was completed, the temperature was increased to 75° C., and refluxing was carried out as the mixture was stirred. The product was cooled, the lower layer was separated, and the upper toluene-solution layer was washed three times with water. The washed toluene-solution layer was combined with 0.40 g of potassium hydroxide, and refluxing was carried out while water was removed through a water-separation tube. When removal of water was completed, the product was condensed to 75% concentration of solids, and refluxing was repeated for an additional five hours. Upon completion of refluxing, the product was combined with 0.47 g of acetic acid, neutralized, and filtered. The obtained toluene-solution was concentrated in vacuum, whereby 395 g of a solid methylphenylvinylpolysiloxane resin characterized by the siloxane unit formula and average compositional formula given below were produced.

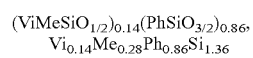

$(ViMeSiO_{1/2})_{0.14}(PhSiO_{3/2})_{0.86}$,
$Vi_{0.14}Me_{0.28}Ph_{0.86}Si_{1.36}$

A weight-average molecular weight measured by gel permeation chromatography with polystyrene as standard was equal to 3030.

Synthesis Example 2

A four-neck flask equipped with a stirrer, reflux condenser, loading port, and thermometer was filled with 100 g of toluene, 50 g of water, and 50 g of isopropyl alcohol. The components were mixed, stirred, and combined with a mixture of 14.11 g methylvinyldichlorosilane, 19.37 g dimethyldichlorosilane, and 158.7 g phenyltrichlorosilane added dropwise during 1 hour. When the addition was completed, the mixture was stirred at room temperature for 1 hour. The lower layer was separated, and the upper toluene-solution layer was washed three times with water. The washed toluene-solution layer was combined with 0.12 g of potassium hydroxide, and refluxing was carried out while water was removed through a water-separation tube. When removal of water was completed, the product was condensed to 70% concentration of solids, and refluxing was repeated for an additional five hours. The product was cooled, combined with 0.33 g of dimethyldichlorosilane, neutralized, and filtered. The obtained upper toluene-solution was concentrated in vacuum, whereby 115 g of a solid methylphenylvinylpolysiloxane resin characterized by the siloxane unit formula and average compositional formula given below were produced.

$$(ViMe_2SiO_{2/2})_{0.10}(Me_2SiO_{2/2})_{0.15}(PhSiO_{3/2})_{0.75},$$
$$Vi_{0.10}Me_{0.40}Ph_{0.75}SiO_{1.375}$$

A weight-average molecular weight measured by gel permeation chromatography with polystyrene as standard was equal to 7200.

Synthesis Example 3

A four-neck flask equipped with a stirrer, reflux condenser, loading port, and thermometer was filled with 82.2 g of 1,3-divinyl-1,1,3,3-tetramethyldisolxane, 143 g of water, 0.38 g of trifluoromethanesulfonic acid, and 500 g of toluene. The components were stirred, and then 524.7 g of a phenyltrimethoxysilane were added dropwise during 1 hour under stirring conditions of the mixture. When the addition was completed, refluxing was carried out with heating for 1 hour. The product was cooled, the lower layer was separated, and the upper toluene-solution layer was washed three times with water. The washed toluene-solution layer was combined with 0.40 g of potassium hydroxide, and refluxing was carried out while water was removed through a water-separation tube. When removal of water was completed, the product was condensed to 75% concentration of solids, and refluxing was repeated for an additional five hours. The product was cooled, combined with 0.47 g of acetic acid, neutralized, and filtered. The obtained upper toluene-solution was concentrated in vacuum, whereby 420 g of a solid methylphenylvinylpolysiloxane resin characterized by the siloxane unit formula and average compositional formula given below were produced.

$$ViMe_2SiO_{1/2})_{0.25}(PhSiO_{3/2})_{0.75},$$
$$Vi_{0.25}Me_{0.50}Ph_{0.75}SiO_{1.25}$$

A weight-average molecular weight measured by gel permeation chromatography with polystyrene as standard was equal to 2300.

Synthesis Example 4

A four-neck flask equipped with a stirrer, reflux condenser, loading port, and thermometer was filled with 200 g of toluene, 500 g of water. Under a condition of stirring, the components were combined with a mixture of 54.0 g phenyltrichlorosilane, 24.7 g dimethyldichlorosilane, and 148.4 g methylvinyldichlorosilane added dropwise during 1 hour. When the addition was completed, the mixture was refluxed for 2 hours and cooled to room temperature. The water layer was removed, and the toluene solution layer was washed four times with water. The washed toluene-solution layer was filtered, the filtrate was distilled in vacuum, and the toluene was thus removed. The product obtained in an amount of 125 g was comprised of a semi-solid methylphenylvinylpolysiloxane resin characterized by the siloxane unit formula and average compositional formula given below.

$$(ViMeSiO_{2/2})_{0.30}(Me_2SiO_{2/2})_{0.15}(PhSiO_{3/2})_{0.55},$$
$$Vi_{0.30}Me_{0.60}Ph_{0.55}SiO_{1.275}$$

A weight-average molecular weight measured by gel permeation chromatography with polystyrene as standard was equal to 2700.

Synthesis Example 5

A four-neck flask equipped with a stirrer, reflux condenser, loading port, and thermometer was filled with 100 g of toluene, 50 g of water, and 50 g of isopropyl alcohol. The components were mixed and combined with a mixture of 7.06 g methylvinyldichlorosilane, 25.8 g dimethyldichlorosilane, and 158.7 g phenyltrichlorosilane added dropwise during 1 hour under stirring conditions. When the addition was completed, the mixture was stirred at room temperature for 1 hour. The lower layer was separated, and the upper toluene-solution layer was washed three times with water. The washed toluene-solution layer was combined with 0.12 g of potassium hydroxide, and refluxing was carried out while water was removed through a water-separation tube. When removal of water was completed, the product was condensed to 70% concentration of solids, and refluxing was repeated for an additional five hours. The product was cooled, combined with 0.33 g of dimethyldichlorosilane, neutralized, and filtered. The obtained toluene solution was concentrated in vacuum, whereby 109 g of a solid methylphenylvinylpolysiloxane resin characterized by the siloxane unit formula and average compositional formula given below were produced.

$$(ViMeSiO_{2/2})_{0.05}(Me_2SiO_{2/2})_{0.20}(PhSiO_{3/2})_{0.75},$$
$$Vi_{0.05}Me_{0.45}Ph_{0.75}SiO_{1.375}$$

A weight-average molecular weight measured by gel permeation chromatography with polystyrene as standard was equal to 7100.

Synthesis Example 6

A four-neck flask equipped with a stirrer, reflux condenser, loading port, and thermometer was filled with 18.8 g of 1,3-divinyl-1,1,3,3-tetramethyldisolxane, 14.6 g of hexamethyldichlorosilane, 81.9 of water, 0.19 g of trifluoromethanesulfonic acid, and 200 g of toluene. The components were mixed, and then a mixture of 138.6 g of methyltrimethoxy silane and 100.1 g of phenyltrimethoxysilane was added dropwise during 1 hour under stirring conditions. When the addition was completed, refluxing was carried out with heating for 1 hour. The product was cooled, the lower layer was separated, and the upper toluene-solution layer was washed three times with water. The washed toluene-solution layer was combined with 0.2 g of potassium hydroxide, and refluxing was carried out while water was removed through a water-separation tube. When removal of water was completed, the product was condensed to 50% concentration of solids, and refluxing was repeated for an additional five hours. The product was cooled, combined with 0.47 g of acetic acid, neutralized, and filtered. The obtained toluene solution was concentrated in vacuum, whereby 187 g of a solid methylphenylvinylpolysiloxane resin characterized by the siloxane unit formula and average compositional formula given below were produced.

$$(ViMe_2SiO_{2/2})_{0.10}(Me_3SiO_{2/2})_{0.15}(PhSiO_{3/2})_{0.25}(MeSiO_{3/2})_{0.50}, Vi_{0.10}Me_{1.15}Ph_{0.25}SiO_{0.75}$$

A weight-average molecular weight measured by gel permeation chromatography with polystyrene as standard was equal to 4200.

Synthesis Example 7

A four-neck flask equipped with a stirrer, reflux condenser, loading port, and thermometer was filled with 194.6 g of phenyltrimethoxysilane and 0.22 g of trifluoromethanesulfonic acid. The components were mixed and then combined under stirring conditions with 13.3 g of water added dropwise during 15 minutes. When the addition was completed, the mixture was refluxed for 1 hour with heating and cooled to room temperature. The mixture was combined with 118.6 g of 1,1,3,3-tetramethyldisiloxane, and then 88.4 g of acetic acid were added dropwise during 30 min., while the mixture was stirred. Upon completion of the addition, the mixture was heated to 50° C. with continued stirring, and a reaction was conducted for 3 hours. The reaction product was cooled to room temperature, combined with toluene and water, thoroughly mixed, left still standing, and then the water layer was separated. The upper toluene-solution layer was washed three times with water and condensed in vacuum. The product obtained in an amount of 220 g was comprised of a methylphenylhydrogenoligosiloxane characterized by the siloxane unit formula and average compositional formula given below.

$$(HMe_2SiO_{1/2})_{0.60}(PhSiO_{3/2})_{0.40},$$
$$H_{0.60}Me_{1.20}Ph_{0.40}SiO_{0.90}$$

Viscosity of the product was 0.25 Pa·s.

Synthesis Example 8

A four-neck flask equipped with a stirrer, reflux condenser, loading port, and thermometer was filled with 302.8 g of phenyltrimethoxysilane and 0.27 g of trifluoromethanesulfonic acid. The components were mixed and then combined under stirring conditions with 32.1 g of water added dropwise during 15 minutes. When the addition was completed, the mixture was refluxed for 1 hour with heating and cooled to room temperature. The mixture was combined with 82.0 g of 1,1,3,3-tetramethyldisiloxane, and then 61.1 g of acetic acid were added dropwise during 30 min., while the mixture was stirred. Upon completion of the addition, the mixture was heated to 50° C. with continued stirring, and a reaction was conducted for 3 hours. The reaction product was cooled to room temperature, combined with toluene and water, thoroughly mixed, left still standing, and then the water layer was separated. The upper toluene-solution layer was washed three times with water and condensed in vacuum. The product obtained in an amount of 260 g was comprised of a methylphenylhydrogenoligosiloxane characterized by the siloxane unit formula and average compositional formula given below.

$$(HMe_2SiO_{1/2})_{0.40}(PhSiO_{3/2})_{0.60},$$
$$H_{0.40}Me_{0.80}Ph_{0.60}SiO_{1.10}$$

Viscosity of the product was 9.8 Pa·s.

Synthesis Example 9

A four-neck flask equipped with a stirrer, reflux condenser, loading port, and thermometer was filled with 144 g of 1,3,5,7-tetramethylcyclotetrasiloxane, 130 g of water, and 0.38 g of trifluoromethanesulfonic acid. The components were mixed and then combined under stirring conditions with 476 g of phenyltrimethoxysilane added dropwise during 15 minutes. When the addition was completed, the mixture was stirred for 3 hours at room temperature, combined with 750 g of toluene, 100 g of water, thoroughly stirred, left still standing, and then the water layer was separated. The upper toluene solution layer was washed three times with water and condensed in vacuum. The product obtained in an amount of 465 g was comprised of a methylphenylhydrogenoligosiloxane characterized by the siloxane unit formula and average compositional formula given below.

$$(HMe_2SiO_{2/2})_{0.50}(PhSiO_{3/2})_{0.50},$$
$$H_{0.50}Me_{0.50}Ph_{0.50}SiO_{1.25}$$

Viscosity of the product was 2.2 Pa·s.

Practical Example 1

A uniform mixture was prepared from the following components: 100 parts by weight of the methylphenylvinylpolysiloxane resin obtained in Synthesis Example 1; 17.8 parts by weight of a diphenylbis(dimethylvinylsiloxy)silane; 30 parts by weight of the methylphenylhydrogenoligosiloxane obtained in Synthesis Example 7; 0.015 parts by weight of a 1,3-divinyl-1,1,3,3-tetramethyldisiloxane solution of a platinum-1,3-divinyl-1,1,3,3-tetramethyldisiloxane complex (with 5% amount of metallic platinum), and 0.30 parts by weight of 1-ethynylcyclohexanol. As a result, an addition-curable organopolysiloxane resin composition having a viscosity of 1.040 Pa·s was prepared. A cured body obtained from the composition had durometer hardness of 70 at 25° C. and a durometer hardness of 43 at 150° C. Light transmittance through the cured body was 99.1% for 400 nm light and 97.9% for 600 nm light.

Practical Example 2

A uniform mixture was prepared from the following components: 100 parts by weight of the methylphenylvinylpolysiloxane resin obtained in Synthesis Example 2; 19.7 parts by weight of a diphenylbis(dimethylvinylsiloxy)silane; 31.6 parts by weight of the methylphenylhydrogenoligosiloxane obtained in Synthesis Example 7; 0.015 parts by weight of a 1,3-divinyl-1,1,3,3-tetramethyldisiloxane solution of a platinum-1,3-divinyl-1,1,3,3-tetramethyldisiloxane complex (with 5% amount of metallic platinum); and 0.30 parts by weight of 1-ethynylcyclohexanol. As a result, an addition-curable organopolysiloxane resin composition having a viscosity of 1.100 Pa·s was prepared. A cured body obtained from the composition had a durometer hardness of 72 at 25° C. and a durometer hardness of 56 at 150° C. Light transmittance through a cured body was 99.3% for 400 nm light and 98.2% for 600 nm light.

Practical Example 3

A uniform mixture was prepared from the following components: 100 parts by weight of the methylphenylvinylpolysiloxane resin obtained in Synthesis Example 2; 11.1 parts by weight of a diphenylbis(dimethylvinylsiloxy)silane; 22.2 parts by weight of the phenyltris-(dimethylvinylsiloxy)silane; 88.0 parts by weight of methylphnylhydrogenpolysiloxane obtained in Synthesis Example 8; 0.022 parts by weight of a 1,3-divinyl-1,1,3,3-tetramethyldisiloxane solution of a platinum-1,3-divinyl-1,1,3,3-tetramethyldisiloxane complex (with 5% amount of metallic platinum), and 0.33 parts by weight of 1-ethynylcyclohexanol. As a result, an addition-curable organopolysiloxane resin composition having a viscosity of 12 Pa·s was prepared. A cured body obtained from the composition had a durometer hardness of 68 at 25° C. and a durometer hardness of 48 at 150° C. Light transmittance through a cured body was 98.8% for 400 nm light and 97.5% for 600 nm light.

Practical Example 4

A uniform mixture was prepared from the following components: 100 parts by weight of the methylphenylvinylpolysiloxane resin obtained in Synthesis Example 2; 11.1 parts by weight of a diphenyl bis(dimethylvinylsiloxy)silane; 22.2 parts by weight of the phenyltris (dimethylvinylsiloxy)silane; 85.0 parts by weight of methylphenylhydrogenpolysiloxane obtained in Synthesis Example 9; 0.022 parts by weight of a 1,3-divinyl-1,1,3,3-tetramethyldisiloxane solution of a platinum-1,3-divinyl-1,1,3,3-tetramethyldisiloxane complex (with 5% amount of metallic platinum), and 0.11 parts by weight of 1-ethynylcyclohexanol. As a result, an addition-curable organopolysiloxane resin composition having a viscosity of 15 Pa·s was prepared. A cured body obtained from the composition had a durometer hardness of 72 at 25° C. and a durometer hardness of 53 at 150° C. Light transmittance through a cured body was 99.2% for 400 nm light and 97.8% for 600 nm light.

Comparative Example 1

A uniform mixture was prepared from the following components: 100 parts by weight of the methylphenylvinylpolysiloxane resin obtained in Synthesis Example 3; 22.5 parts by weight of a diphenyl bis(dimethylvinylsiloxy)silane; 90.1 parts by weight of methylphenylhydrogenpolysiloxane obtained in Synthesis Example 8; 0.022 parts by weight of a 1,3-divinyl-1,1,3,3-tetramethyldisiloxane solution of a platinum-1,3-divinyl-1,1,3,3-tetramethyldisiloxane complex (with 5% amount of metallic platinum), and 0.22 parts by weight of 1-ethynylcyclohexanol. As a result, an addition-curable organopolysiloxane resin composition having a viscosity of 4.8 Pa·s was prepared. A cured body obtained from the composition had a durometer hardness of 68 at 25° C. and a durometer hardness of 32 at 150° C. Light transmittance through a cured body was 99.0% for 400 nm light and 97.5% for 600 nm light.

Comparative Example 2

A uniform mixture was prepared from the following components: 100 parts by weight of the methylphenylvinylpolysiloxane resin obtained in Synthesis Example 4; 51.1 parts by weight of a methylphenyloligosiloxane having silicon-bonded hydrogen atoms that was obtained in Synthesis Example 7; 0.015 parts by weight of a 1,3-divinyl-1,1,3,3-tetramethyldisiloxane solution of a platinum-1,3-divinyl-1,1,3,3-tetramethyldisiloxane complex (with 5% amount of metallic platinum); and 0.30 parts by weight of 1-ethynylcyclohexanol. As a result, an addition-curable organopolysiloxane resin composition having a viscosity of 32 Pa·s was prepared. A cured body obtained from the composition had a durometer hardness of 72 at 25° C. and a durometer hardness of 30 at 150° C. Light transmittance through a cured body was 99.3% for 400 nm light and 96.3% for 600 nm light.

Comparative Example 3

A uniform mixture was prepared from the following components: 100 parts by weight of the methylphenylvinylpolysiloxane resin obtained in Synthesis Example 2; 16.5 parts by weight of a phenyltris(dimethylvinylsiloxy)silane; 29.5 parts by weight of phenyltris (hydrogendimethylsiloxy) silane; 0.018 parts by weight of a 1,3-divinyl-1,1,3,3-tetramethyldisiloxane solution of a platinum-1,3-divinyl-1,1,3,3-tetramethyldisiloxane complex (with 5% amount of metallic platinum); and 0.29 parts by weight of 1-ethynylcyclohexanol. As a result, an addition-curable organopolysiloxane resin composition having a viscosity of 16 Pa·s was prepared. A cured body obtained from the composition had a durometer hardness of 70 at 25° C. and a durometer hardness of 35 at 150° C. Light transmittance through a cured body was 98.5% for 400 nm light and 97% for 600 mn light.

Comparative Example 4

A uniform mixture was prepared from the following components: 100 parts by weight of the methylphenylvinylpolysiloxane resin obtained in Synthesis Example 5; 40 parts by weight of a diphenylbis(dimethylvinylsiloxy)silane; 69.5 parts by weight of a methylphenylhydrogenpolysiloxane that was obtained in Synthesis Example 8; 0.021 parts by weight of a 1,3-divinyl-1,1,3,3-tetramethyldisiloxane solution of a platinum-1,3-divinyl-1,1,3,3-tetramethyldisiloxane complex (with 5% amount of metallic platinum); and 0.21 parts by weight of 1-ethynylcyclohexanol. As a result, an addition-curable organopolysiloxane resin composition having a viscosity of 0.24 Pa·s was prepared. A cured body obtained from the composition had a durometer hardness of 52 at 25° C. and a durometer hardness below 20 at 150° C. Light transmittance through a cured body was 99.0% for 400 nm light and 98.2% for 600 mn light.

Comparative Example 5

A uniform mixture was prepared from the following components: 100 parts by weight of the methylphenylvinylpolysiloxane resin obtained in Synthesis Example 6; 12.3 parts by weight of a phenyltris(dimethylvinylsiloxy)silane; 23.6 parts by weight of a methyloligosiloxane having viscosity of 25 Pa·s and expressed by the following siloxane unit formula: $(HMe_2SiO_{2/2})_{0.40}(SiO_{4/2})_{0.40}$; 0.014 parts by weight of a 1,3-divinyl-1,1,3,3-tetramethyldisiloxane solution of a platinum-1,3-divinyl-1,1,3,3-tetramethyldisiloxane complex (with 5% amount of metallic platinum); and 0.14 parts by weight of 1-ethynylcyclohexanol. As a result, an addition-curable organopolysiloxane resin composition having a viscosity of 2.7 Pa·s was prepared. A cured body obtained from the composition had a durometer hardness of 66 at 25° C. and a durometer hardness below 20 at 150° C. Light transmittance through a cured body was 98.5% for 400 nm light and 97.2% for 600 nm light.

Table 1 given below shows the following items: values of "a", "b", and mole % of phenyl groups (abbreviated as Ph %) in $R^2$ in average compositional formula (1) of Component (A); values of "c", "d", and mole % of phenyl groups (abbreviated as Ph %) in $R^4$ in a average compositional formula (2) of Component (B); values of "e", "f", and mole % of phenyl groups in $R^5$ in average compositional formula (3) of Component (C); and a weight-average molecular weight (abbreviated as Mw) of Component (A) determined by gel chromatography with reference to polystyrene as a standard. Values of the comparative examples that are beyond the scope of the claims of the present invention are given in parentheses.

TABLE 1

| | Component (A) | | | | Component (B) | | | Component (C) | | |
|---|---|---|---|---|---|---|---|---|---|---|
| | a | b | Ph % | Mw | c | d | Ph % | e | f | Ph % |
| Pr. Ex. 1 | 0.15 | 1.15 | 74 | 3030 | 0.67 | 2.00 | 33 | 0.60 | 1.60 | 25 |
| Pr. Ex. 2 | 0.10 | 1.15 | 65 | 7200 | 0.67 | 2.00 | 33 | 0.60 | 1.60 | 25 |
| Pr. Ex. 3 | 0.10 | 1.15 | 65 | 7200 | 0.50 | 1.83 | 20 | 0.40 | 1.40 | 43 |
| Pr. Ex. 4 | 0.10 | 1.15 | 65 | 7200 | 0.50 | 1.83 | 20 | 0.50 | 1.00 | 50 |
| Comp. Ex. 1 | (0.25) | 1.25 | 60 | (2300) | 0.67 | 2.00 | 33 | 0.40 | 1.40 | 43 |
| Comp. Ex. 2 | (0.30) | 1.15 | 48 | (2700) | — | — | — | 0.60 | 1.60 | 25 |
| Comp. Ex. 3 | 0.10 | 1.15 | 65 | 7200 | 0.75 | 1.75 | 14 | (0.75) | (1.75) | (14) |
| Comp. Ex. 4 | (0.05) | 1.15 | 65 | 7100 | 0.67 | 2.00 | 33 | 0.40 | 1.40 | 43 |
| Comp. Ex. 5 | 0.10 | (1.40) | (18) | 4200 | 0.75 | 1.75 | 14 | 0.50 | (1.00) | (0) |

Table 2 shows ratios of component (A), (B), and (C) and durometer hardness of the cured bodies. Values of the comparative examples that are beyond the scope of the claims of the present invention are given in parentheses.

TABLE 2

| | Contents | | | Viscosity | Durometer Hardness | |
|---|---|---|---|---|---|---|
| | (A) | (B) | (C) | Pa · s | 25° C. | 150° C. |
| Pr. Ex. 1 | 100 | 17.8 | 30.0 | 1040 | 70 | 43 |
| Pr. Ex. 2 | 100 | 19.7 | 31.6 | 1100 | 72 | 56 |
| Pr. Ex. 3 | 100 | 33.3 | 88.0 | 12 | 68 | 48 |
| Pr. Ex. 4 | 100 | 33.3 | 85.0 | 15 | 72 | 53 |
| Comp. Ex. 1 | 100 | 22.5 | 90.1 | 4.8 | 68 | (32) |
| Comp. Ex. 2 | 100 | (0) | 51.1 | 32 | 72 | (30) |
| Comp. Ex. 3 | 100 | 16.5 | 29.5 | 16 | 70 | (35) |
| Comp. Ex. 4 | 100 | 40 | 69.5 | 24 | (52) | (20) |
| Comp. Ex. 5 | 100 | 12.3 | 23.6 | 2.7 | 66 | (20) |

INDUSTRIAL APPLICABILITY

The addition-curable organopolysiloxane resin composition of the present invention possesses excellent flowability, moldability in combination with transparency, high hardness, strength in a cured state, and an ability to preserve its hardness at high temperatures. Therefore, it is suitable for preparation of optical materials, e.g., for materials permeable to visible light, infrared rays, ultraviolet rays, near-ultraviolet rays, X-rays, laser rays, etc. These materials are especially advantageous for optical parts and elements operating at temperatures higher than room temperature, e.g., at 50 to 200° C., as well as for optical parts operating in direct contact or in vicinity of light sources of high light intensity. As the optical materials of the invention are highly transparent, hard, strong, and do not lose their hardness at high temperatures, they can be used in light-emitting displays, lamp illumination devices, optical instruments operating at high temperatures, elements and devices of optical communication systems, etc.

The invention claimed is:

1. An addition-curable organopolysiloxane resin composition having, in a state of a cured body, a hardness of 60 to 100 at 25° C. and of 40 to 100 at 150° C. as measured in accordance with the provisions of ASTM D2240-86, said composition comprising:

(A) 100 parts by weight of an organopolysiloxane resin represented by the following average compositional formula:

$$R^1_a R^2_b SiO_{(4-a-b)/2} \quad (1)$$

where $R^1$ designates alkenyl groups with 2 to 10 carbon atoms, $R^2$ designates substituted or non-substituted univalent hydrocarbon groups (except for alkenyl groups), at least 50 mole % of $R^2$ is comprised of phenyl groups; "a" is within the range of 0.09 to 0.16, and "b" is within the range of 1.00 to 1.20, said organopolysiloxane resin being comprised of at least alkenyl groups and phenyl groups and having a weight-average molecular weight, with polystyrene as reference and determined by gel chromatography, equal to or exceeding 3000;

(B) 10 to 50 parts by weight of an organooligosiloxane represented by the following average compositional formula:

$$R^3_c R^4_d SiO_{(4-c-d)/2} \quad (2)$$

where $R^3$ designates alkenyl groups with 2 to 10 carbon atoms, $R^4$ designates substituted or non-substituted univalent hydrocarbon groups (except for alkenyl groups), at least 10 mole % of $R^4$ is comprised of phenyl groups; "c" is within the range of 0.60 to 0.80, and "d" is within the range of 1.50 to 2.10, said organooligosiloxane being comprised of at least alkenyl groups and phenyl groups;

(C) 20 to 100 parts by weight of an organohydrogenoligosiloxane or organohydrogenpolysiloxane represented by the following average compositional formula:

$$H_e R^5_f SiO_{(4-e-f)/2} \quad (3)$$

where $R^5$ designates substituted or non-substituted univalent hydrocarbon groups (except for alkenyl groups), at least 20 mole % of $R^5$ is comprised of phenyl groups; "e" is within the range of 0.35 to 0.65, and "f" is within the range of 0.90 to 1.70; and (D) an addition-reaction catalyst in a catalytic quantity.

2. The addition-curable organopolysiloxane resin composition of claim 1, wherein: in said average compositional formula (1), "a" is within the range of 0.10 to 0.15, and "b" is within the range of 1.00 to 1.15; in said average compositional formula (2), "c" is within the range of 0.60 to 0.80, and "d" is within the range of 1.50 to 2.00; and in said average compositional formula (3), "e" is within the range of 0.35 to 0.65, and "f" is within the range of 1.30 to 1.70.

3. The addition-curable organopolysiloxane resin composition according to claim 1, wherein component (B) is an organooligosiloxane expressed by the following formula:

$$(R^7 R^8_2 SiO)_g SiR^8_{(4-g)} \quad (4)$$

where $R^7$ designates alkenyl groups with 2 to 10 carbon atoms, $R^8$, each independently, designate substituted or non-substituted univalent hydrocarbon groups (except for alkenyl groups), at least 10 mole % of $R^8$ is comprised of phenyl groups; and "g" is 2 or 3, said organooligosiloxane being comprised of at least alkenyl groups and phenyl groups.

4. An optical material that comprises a cured body obtained by curing the following components via an addition reaction:
   (A) 100 parts by weight of an organopolysiloxane resin represented by the following average compositional formula:

$$R^1_a R^2_b SiO_{(4-a-b)/2} \quad (1)$$

where $R^1$ designates alkenyl groups with 2 to 10 carbon atoms, $R^2$ designates substituted or non-substituted univalent hydrocarbon groups (except for alkenyl groups), at least 50 mole % of $R^2$ is comprised of phenyl groups; "a" is within the range of 0.09 to 0.16, and "b" is within the range of 1.00 to 1.20, said organopolysiloxane resin being comprised of at least alkenyl groups and phenyl groups and having a weight-average molecular weight, with polystyrene as reference and determined by gel chromatography, equal to or exceeding 3000;
   (B) 10 to 50 parts by weight of an organooligosiloxane represented by the following average compositional formula:

$$R^3_c R^4_d SiO_{(4-c-d)/2} \quad (2)$$

where $R^3$ designates alkenyl groups with 2 to 10 carbon atoms, $R^4$ designates substituted or non-substituted univalent hydrocarbon groups (except for alkenyl groups), at least 10 mole % of $R^4$ is comprised of phenyl groups; "c" is within the range of 0.60 to 0.80, and "d" is within the range of 1.50 to 2.10, said organooligosiloxane being comprised of at least alkenyl groups and phenyl groups;
   (C) 20 to 100 parts by weight of an organohydrogenoligosiloxane or organohydrogenpolysiloxane represented by the following average compositional formula:

$$H_e R^5_f SiO_{(4-e-f)/2} \quad (3)$$

where $R^5$ designates substituted or non-substituted univalent hydrocarbon groups (except for alkenyl groups), at least 20 mole % of $R^5$ is comprised of phenyl groups; "e" is within the range of 0.35 to 0.65, and "f" is within the range of 0.90 to 1.70; said cured body having a hardness of 60 to 100 at 25° C. and 40 to 100 at 150° C. as measured in accordance with the provisions of ASTM D2240-86.

5. The optical material according to claim 4, wherein "a" in said average compositional formula (1) is within the range of 0.10 to 0.15, "b" is within the range of 1.00 to 1.15, wherein "c" in said average compositional formula (2) is within the range of 0.60 to 0.80, "d" is within the range of 1.50 to 2.00, and wherein "e" in said average compositional formula (3) is within the range of 0.35 and 0.65, and "f" is within the range of 1.30 to 1.70.

6. The optical material according to claim 4, wherein component (B) is an organooligosiloxane expressed by the following formula:

$$(R^7 R^8_2 SiO)_g SiR^8_{(4-g)} \quad (4)$$

where $R^7$ designates alkenyl groups with 2 to 10 carbon atoms, $R^8$, each independently, may designate substituted or non-substituted univalent hydrocarbon groups (except for alkenyl groups), at least 10 mole % of $R^8$ is comprised of phenyl groups; and "g" is 2 or 3, said organooligosiloxane being comprised of at least alkenyl groups and phenyl groups.

7. The addition-curable organopolysiloxane resin composition according to claim 2, wherein component (B) is an organooligosiloxane expressed by the following formula:

$$(R^7 R^8_2 SiO)_g SiR^8_{(4-g)} \quad (4)$$

where $R^7$ designates alkenyl groups with 2 to 10 carbon atoms, $R^8$, each independently, designate substituted or non-substituted univalent hydrocarbon groups (except for alkenyl groups), at least 10 mole % of $R^8$ is comprised of phenyl groups; and "g" is 2 or 3, said organooligosiloxane being comprised of at least alkenyl groups and phenyl groups.

8. The optical material according to claim 5, wherein component (B) is an organooligosiloxane expressed by the following formula:

$$(R^7 R^8_2 SiO)_g SiR^8_{(4-g)} \quad (4)$$

where $R^7$ designates alkenyl groups with 2 to 10 carbon atoms, $R^8$, each independently, may designate substituted or non-substituted univalent hydrocarbon groups (except for alkenyl groups), at least 10 mole % of $R^8$ being comprised of phenyl groups; and "g" is 2 or 3), said organooligosiloxane being comprised of at least alkenyl groups and phenyl groups.

* * * * *